(12) United States Patent
Searle

(10) Patent No.: US 7,352,424 B2
(45) Date of Patent: Apr. 1, 2008

(54) ALTERING SURFACE OF DISPLAY SCREEN FROM MATT TO OPTICALLY SMOOTH

(75) Inventor: Mark John Searle, Cambridge (NZ)

(73) Assignee: Deep Video Imaging Limited, Hamilton (NZ)

( * ) Notice: Subject to any disclaimer, the term of this patent is extended or adjusted under 35 U.S.C. 154(b) by 40 days.

(21) Appl. No.: 10/416,885

(22) PCT Filed: Nov. 16, 2001

(86) PCT No.: PCT/NZ01/00258

§ 371 (c)(1),
(2), (4) Date: Nov. 20, 2003

(87) PCT Pub. No.: WO02/41046

PCT Pub. Date: May 23, 2002

(65) Prior Publication Data

US 2004/0066475 A1    Apr. 8, 2004

(30) Foreign Application Priority Data

Nov. 17, 2000  (NZ) .................... 508258
Dec. 12, 2000  (NZ) .................... 508826

(51) Int. Cl.
*G02F 1/1333* (2006.01)
(52) U.S. Cl. .................. 349/122; 349/96; 349/187; 359/443
(58) Field of Classification Search ........ 359/443, 359/453, 460; 349/96, 122, 187
See application file for complete search history.

(56) References Cited

U.S. PATENT DOCUMENTS 4,153,654 A * 5/1979 Maffitt et al. ............. 264/2.5

FOREIGN PATENT DOCUMENTS

JP         10-232304    *  2/1998

* cited by examiner

*Primary Examiner*—David Nelms
*Assistant Examiner*—Timothy L. Rude

(57) ABSTRACT

A matt surface (7) of a display screen (2) is converted to a non-diffuse optically smooth surface (11). The matt surface may be a diffusive surface (7) formed on a birefringent film (6) of an LCD screen (2). The display screen (2) is the front screen of a multilevel three dimensional display comprising layered screens (2, 3). The conversion from matt to non-diffuse and optically smooth surface reduces the blurring of displayed images.

10 Claims, 3 Drawing Sheets

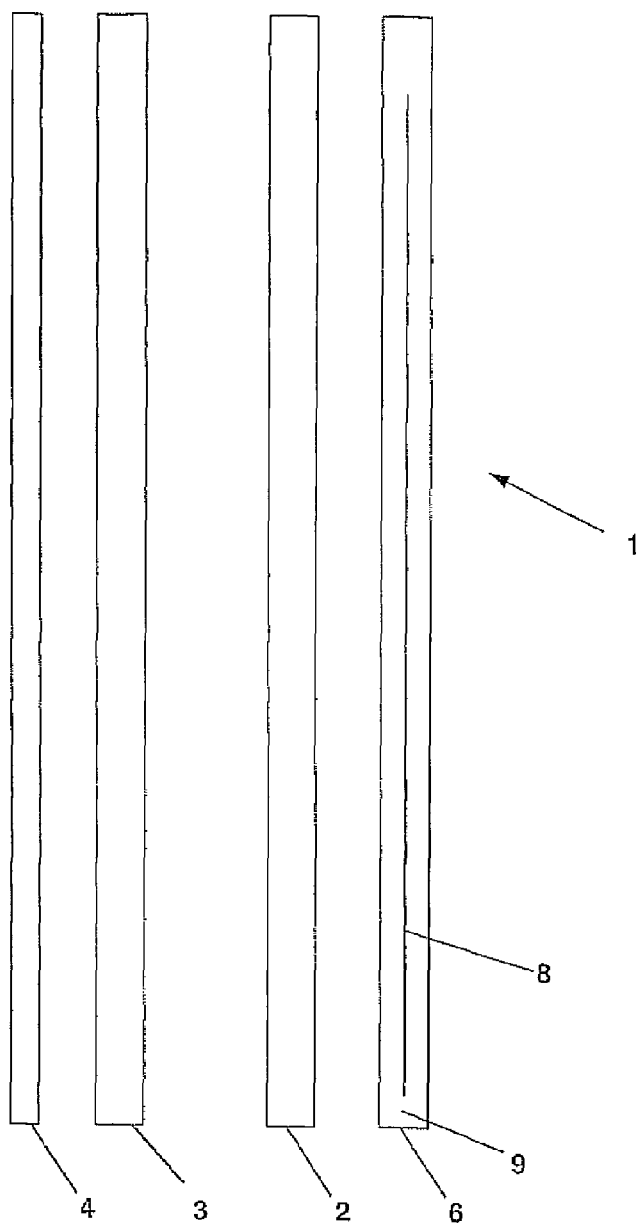

ALTERING SURFACE OF DISPLAY SCREEN FROM MATT TO OPTICALLY SMOOTH

TECHNICAL FIELD

This invention relates to improved viewing technology.

In paticular, this invention will be discussed in relation to 3-dimensional display technology such as that described in the applicant's co-pending patent application PCT/NZ0098/00098 and PCT/0099/00021. It should be seen however, that the principles of the present invention should not be limited to this use and can be applied elsewhere, particularly to display technology whereby a viewer looks through a screen or the like to see another image in the background.

Reference shall now be made to use of the present invention in relation to the technology as disclosed in the above referenced patent applications.

BACKGROUND ART

The applicant has previously developed a 3-dimensional viewing technology. This technology uses in preferred embodiments two or more overlapping liquid crystal display (LCDs) screens positioned parallel to but spaced apart from each other. In addition to the more obvious benefits of 3-dimensional displays in terms of realistic portrayal of depth, the applicant's display technology provides additional potential benefits in terms of preattentive information processing.

The term preattentive processing has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinising for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It maybe readily visualised for example that a red circle would be immediately discernible set amongst a number of blue circles. Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind.

In comparison, if the constituent elements of the above described cubes are reorientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the scrial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence.

In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

Although not restricted to the exclusive use of same, LCD screens are particularly suited for use with the applicant's display technology. As is well known in the art, LCD screens are typically configured with crossed polarisers on either side of the liquid crystals layer. This configuration would therefore block the passage of light through two or more successive LCD screens arranged with identical polarisation axes.

In one means of addressing this problem, the applicants place a bi-refringent film between adjacent LCD screens. This film transforms the polarisation of the light coming from the rear LCD screen from linear polarisation to elliptical polarisation, before it passes through the front LCD screen. This enables the viewer to see an image displayed on the rear LCD screen through the front screen as the effect of the orthogonal polarisers is overcome.

However, further problems occur with the introduction of this extra element. Bi-refringent films do not have a uniform thickness even though the variance is only in the range of micrometres. Therefore, the different wavelengths of incident light such as that comprising 'normal' white light results in polarisation ellipsoids of different axial ratio and/or tilt angle, after transmission through the aforementioned bi-refringent film. Therefore, varying amounts of light of different wavelengths will pass through the polarisers of the front LCD, and the user will see bands of colour.

A further problem of viewing one LCD screen through another LCD screen is that the viewer's perception of the electronic tracery pattern used to address each of the pixels on the LCD screen. The combination of viewing the tracery on the back screen overlaid with the tracery on the front screen causes moiré interference patterns which are very noticeable and unwelcome to the viewer.

In order to address the above-described problems, the applicants formed the bi-refringent film with optically diffusive properties, by etching a matt surface onto one side of the film. This remedies the visual colour anomalies, and the viewer's perception of the tracery on the rear screen. Thus, it can be seen that the introduction of a diffuse element to this technology plays a pivotal role in producing an optically usable multi-LCD screen display.

It is important that the diffuse bi-refringent element is located close to the rear screen to provide the viewer with the greatest divergence of light and thereby providing a wider viewing angle.

A necessary effect of the diffusive nature of the bi-refringent film is a slight blurring of the image on the rear LCD screen. The optimum level of diffusion is the minimum amount that renders the appearance of moiré interference patterns invisible or insignificant. Further diffusion or blurriness is not only unnecessary but detrimental to the perceived quality of the image on the rear screen and hence that of the combined multi-screen display system.

The blurring of the rear screen is compounded by the way that LCD manufacturers presently manufacture their screens. At present, almost all LCD manufacturers produce screens that have a matt surface on one or both sides. This matt surface is intended to reduce glare on the LCD screen by randomly scattering the light reflected off the front of the LCD screen, so that a mirror-type reflected image is not perceived by a viewer. This matt finish may also be on the rear surface of the LCD screen to help to diffuse the screen's normal backlight source.

Unfortunately, this also increases the diffusion of the light being emitted by the rear screen when this standard LCD screen, with matt finish applied to the front and/or rear surface, is used with the applicant's technology as described. This results in an unnecessarily blurred rear image thereby restricting the utility of the 3-dimensional display.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of converting a matt surface of a front screen of a multi focal-plane display configured with two or more optically overlapping screens, characterised by the step of altering the matt surface to provide the front screen with an optically smooth surface.

The, or each screen may be any type of screen used in known display technology such as, for example, a glass or plastic surface used with cathode ray technology and so forth. Reference throughout this specification to a screen being an LCD (liquid crystal display) screen is purely exemplary and should not be viewed as limiting in any way.

The term 'matt surface' as used herein denotes a surface which diffuses light to a greater degree than an optically smooth or glossy surface.

The matt surface typically used in display technologies (for example LCD screens) has an optically rough or irregular surface composed of numerous pits and bumps. The combined effect of this irregular surface together with differing refractive index between the surface material and the ambient air causes both reflected and transmitted light to scatter or otherwise be diffused.

In some embodiments, the matt surface may be formed on a polariser film. More specifically, the polarising film may be formed from a protective transparent layer encapsulating a polarising layer.

According to one embodiment, the step of altering the matt surface to provide the front screen with an optically smooth surface includes applying an at least partially transparent coating to the matt surface. Preferably, the coating is applied as a flowable substance and subsequently hardened to form an optically flat outer surface.

Preferably, the coating is of a material with substantially the same refractive index as the material having the matt surface.

Preferably, the coating flows over, around and/or inside any optical irregularities, distortions, protrusions, or discontinuities of said matt surface to a sufficient thickness to form a substantially optically flat outer surface.

The coating may be applied by a variety of methods including painting, spraying, sputtering, vapour deposition, slurry coating, chemical deposition, screen printing or roll coating.

In an alternative embodiment of the present invention, the step of altering the matt surface to provide the front screen with an optically smooth surface includes attaching an optically smooth transparent film to the matt surface by a transparent adhesive interposed between the film and the matt surface.

Preferably, the adhesive is initially applied to a lower surface of the film, though alternatively, the adhesive may be applied to the matt surface independently from the film.

Preferably, the said adhesive and film are of materials having substantially the same refractive index as the material having the matt surface.

Preferably, the adhesive is capable of flowing over, around and/or inside any optical irregularities, distortions, protrusions, or discontinuities of said matt surface to a sufficient thickness to form a substantially optically fat outer surface.

It should be appreciated that the term film means any layer or material that performs the function as described above.

In a yet further embodiment of the present invention, the step of altering the matt surface to provide the front screen with an optically smooth surface includes removing the existing the material having the matt surface and replacing same with a material having an optically smooth surface.

Preferably said material having an optically smooth surface is a polariser film, preferably formed from a protective transparent layer encapsulating a polarising layer.

According to a further aspect of the present invention, there is provided a display produced by any one of the above-described methods.

Consequently, it has been found that by performing the step of altering the matt surface to provide the front screen with an optically smooth surface as described in any of the above-described embodiments, any effect of the scattering or diffusion of light both transmitted through and reflected from the display technology (in this example LCD screen) is substantially ameliorated.

When a screen which has been converted in accordance with the present invention is used with 3-dimensional technology as described previously, a highly improved clarity in the images viewed on the rear screen is achieved.

The application of any of the aforementioned steps for altering the matt surface of the front screen to an optically smooth surface does not interfere in any way with the operation of the diffuse bi-refringent film in that there are no visible colour patches and/or moiré interference discernible to viewer.

The present invention also has a number of other advantages including the creation of images with improved clarity with a wide angle of view, but without requiring the production of expensive customised screens.

This invention allows all the necessary diffusion of the image on the rear screen to be achieved immediately in front of the rear screen, thus giving the greatest angle of view for the given amount of diffusion, due to the diffuse or scattering element being as far away from the viewer as possible.

BRIEF DESCRIPTION OF DRAWINGS

Further aspects of the present invention will become apparent from the following description which is given by way of example only and with reference to the accompanying drawings in which:

FIG. 3 shows a schematic cross sectional view through a third preferred embodiment of the present invention.

BEST MODES FOR CARRYING OUT THE INVENTION

Figure 1:
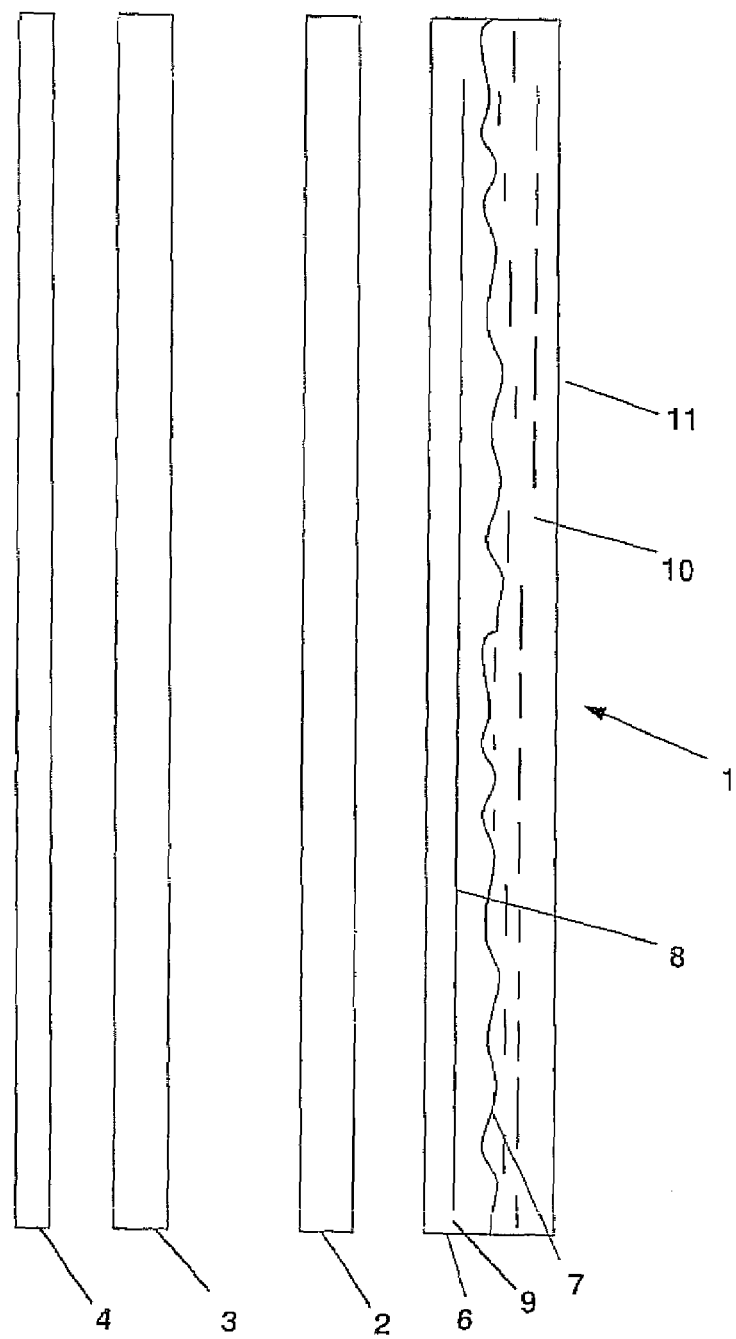
FIG. 1 shows a schematic cross sectional view through a first preferred embodiment of the present invention.
Figure 2:
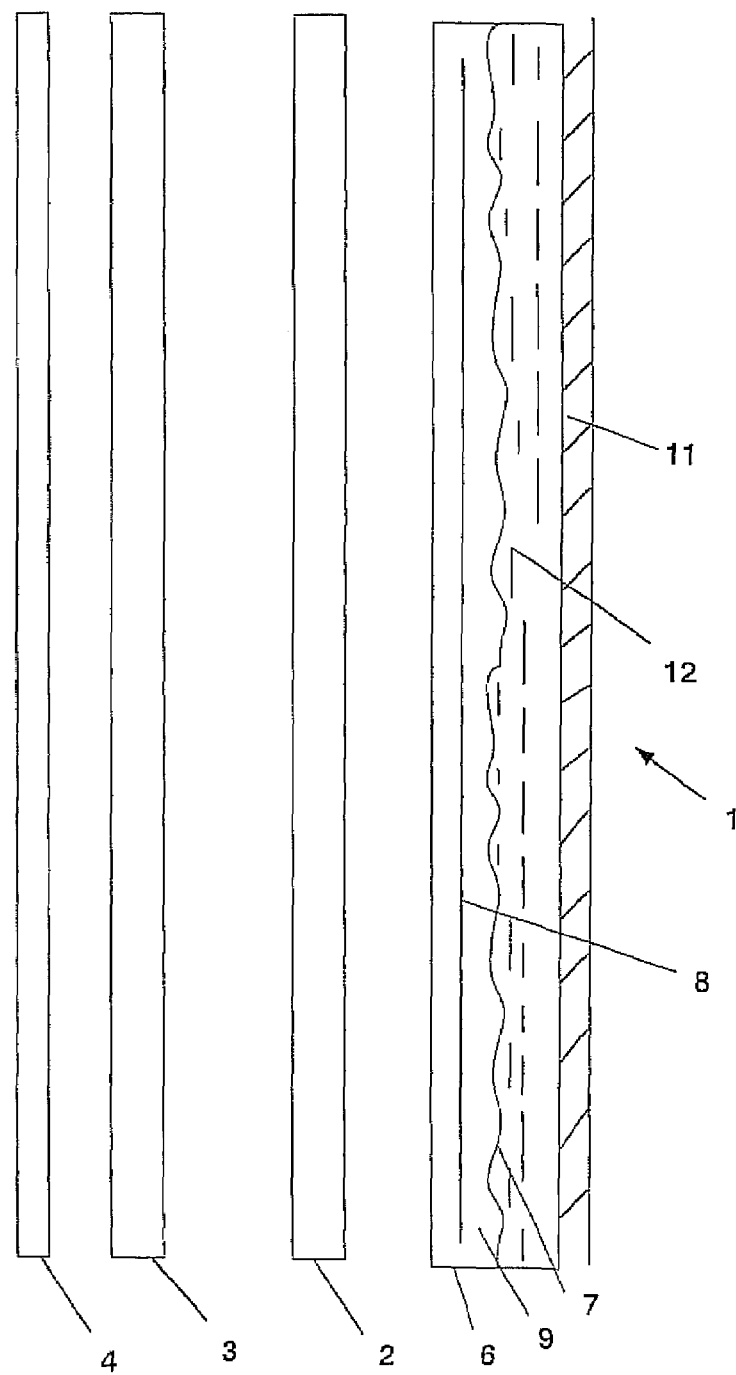
FIG. 2 shows a schematic cross sectional view through a second preferred embodiment of the present invention.

The FIGS. 1-3 illustrate preferred embodiments of the present invention implemented with a dual screen display (1) composed of a plurality of transparent imaging screens in the form of a front LCD screen (2), parallel to, but spaced apart from a rear display screen (3) provided with a backlight (4).

It should be apparent to one skilled in the art that a number of alternative display technologies may be utilised in place of the LCD screens. Furthermore, although FIG. 1 shows a single screen (2) in front of the rear display (3) for the sake of clarity and convenience, any number of additional (at least partially transparent) imaging screens (2) may be incorporated. Although the rear screen (3) may also be an LCD screen, it will be apparent that alternative, non-transparent display technology may be employed.

Such displays provide a three dimensional quality the scene viewed by an observer, as described in the applicants co-pending patents PCT No. PCT/NZ98/00098 and PCT/NZ99/00021, incorporated by reference herein.

As previously discussed, a number of practical considerations need to be overcome to produce a functional display of this type including the reduction or elimination of moiré interference effects, coloured fringes, and crossed-polarisers, which are addressed in a number of ways including the use of diffusers, optical retarders and other optical materials and/or material finishes. However, these are not specifically germane to the present invention.

Thus, for the sake of clarity and to aid understanding of the present invention, the display (1) and associated display screens (2,3) are shown in simplified, schematic form in the drawings; elements not essential to illustrate the present invention are omitted from the drawings to aid comprehension.

Although the visual colour anomalies and the viewer's perception of the tracery on the rear screen arc remedied by use of a bi-refringent film with an optically diffusive matt surface etched onto one side of the film, further difficulties result from this configuration.

Due to the intrinsic diffusive nature of the bi-refringent film, a slight blurring of the image on the rear LCD screen (2) renders the appearance of moiré interference patterns invisible or insignificant. However, further diffusion or blurriness is detrimental to the clarity of the image perceived by an observer.

The blurring of the rear screen (2) is compounded by the current production techniques and practices employed by LCD manufacturers.

Currently, the predominant majority of LCD screen manufacturers produce screens that have a matt surface on one or both sides intended to reduce glare. However, this matt surface applied to the front and or rear surface increases the diffusion of the light being emitted by the rear screen (3) when used with the applicant's display technology blurring and thus degrading the resultant display (1) image. The present invention addresses this problem by altering the matt surface to provide the front screen with an optically smooth surface.

The applicant investigated a number of ways to achieve this effect. The applicant initially tried to even the surface of the screen through polishing, though unfortunately, this was found to be impractical due to the hardness of the materials from which the screens (2,3) are made.

FIG. 1 shows a first embodiment in which the front layer (6) of the front screen (2) is formed with a matt surface (7), depicted with exaggerated proportions to aid understanding of the invention. In the embodiment shown, the front layer (6) of the front screen (2) is a comprised of a polariser (8), encapsulated within a protective laminate (9).

According to one aspect of the present invention there is provided a method of altering the matt surface (7) of the front screen (2), to an optically smooth surface by applying an at least partially transparent coating (10) to the matt surface (7).

The applicant then looked at the application of various flowable substances to the screen. While all oil based substances tested (for example silicon grease) provided the optical requirements, they are impractical in that they can be readily rubbed off from the screen.

As the matt surface (7) consists of optical irregularities, distortions, protrusions, or discontinuities, the coating (10) is applied in a flowable form to cover these irregularities to a depth sufficient to form a substantially optically flat outer surface (11).

Therefore, the coating is applied as a flowable substance and subsequently hardened to form an optically flat outer surface.

The coating (10) may be applied by a variety of methods including painting, spraying, sputtering, vapour deposition, slurry coating, chemical deposition, screen printing or roll coating.

The applicant determined that the coating required would preferably have the is following qualities.

To be capable of covering all the surface irregularities of the matt surface (7) without forming any voids or optical distortions.
To posses substantially the same refractive index as the material having the matt surface.
Be readily applied, and thereupon hardening to a resilient finish.
To provide an optically homogenous finish.
To be durable and resistant to temperature variations and stress.

The applicant has discovered that one material that meets all of these requirements is a lacquer or two-pot epoxy resin. While many epoxy resins are suitable, one example is that sold under the brand name of DuPont Centuri 690S 2PAC High Build Clear.

While this material works particularly well, it should be appreciated that other materials which have the required properties may also be used.

FIG. 2. shows a further embodiment in which the coating (10) is replaced,—both physically and operationally by an optically smooth transparent film (11) and a transparent adhesive (12) interposed between the film and the matt surface.

The adhesive (12) may be applied to a lower surface of the film (11) prior to being applied (in conjunction with the film 11) to the matt surface (7), though alternatively, the adhesive (12) may be applied to the matt surface (7) independently from the film (11).

This second embodiment is still required to fulfil the above-listed criteria given for the first embodiment. Consequently, the adhesive (12) and film (11) are formed from materials having substantially the same refractive index as the material (9) having the is matt surface (7).

Preferably, the adhesive is capable of flowing over, around and/or inside any optical irregularities, distortions, protrusions, or discontinuities of said matt surface to a sufficient thickness to form a substantially optically flat outer surface.

In a yet further embodiment (shown in FIG. 3.) the step of altering the matt surface to provide the front screen (2) with an optically smooth surface includes removing the existing material having the matt surface and replacing same with a material having an optically smooth surface. The matt surface (7) of a polariser (8) and protective laminate (9) of existing LCD screen (as shown in FIGS. 1 and 2) of the type predominantly produced by large volume LCD screen manufacturers is replaced by an LCD screen (2) having an optically smooth (i.e., non-matt) outer surface.

In the embodiment shown in FIG. 3, the optically smooth outer surface is formed by the surface of the protective coating (9) of a polariser (8). Such operations may only be performed by relatively specialised and commensurately expensive companies. Therefore, unless further operations (unrelated to the present invention) are required to be performed on the LCD screen, this technique is less desirable than the fast or second embodiments described above.

It should be seen that the present invention provides an improved display technology and encompasses a method of converting existing screens, the converted screen itself, and other technology which incorporates the converted screen.

Aspects of the present invention have been described by way of example only and it should be appreciated that modifications and additions may be made thereto without departing from the scope of the present invention.

The invention claimed is:

1. A method of altering a surface of a multi focal-plane display said method comprising:
  removing an existing material comprising a matte surface from said multi focal-plane display; and and
  replacing said existing material comprising said matte surface with a material comprising a non-diffuse surface.

2. The method of claim 1, wherein at least one display screen of said multi focal-plane display comprises an LCD.

3. The method of claim 1, wherein said material comprising said non-diffuse surface comprises a polarizer film.

4. The method of claim 3, wherein said polarizer film is formed from a protective transparent layer encapsulating a polarizing layer.

5. The method of claim 1, wherein said multi focal-plane display comprises a first display screen and a second display screen, and wherein said first and second display screens overlap.

6. The method of claim 5, wherein said material comprising said matte surface is removed from said second display screen and replaced with said material comprising said non-diffuse surface.

7. The method of claim 6, wherein a graphical object displayed on said first display screen is viewable through said second display screen, and wherein said graphical object has greater clarity when viewed through said material comprising said non-diffuse surface than when viewed through said material comprising said matte surface.

8. The method of claim 5, wherein said second display screen is interchangeable with a third display screen, wherein said second display screen is coupled with said material comprising said matte surface and said third display screen is coupled with said material comprising said non-diffuse surface.

9. The method of claim 8, wherein a graphical object displayed on said first display screen is viewable through at least one of said second and third display screens, and wherein said graphical object has greater clarity when viewed through said material comprising said non-diffuse surface than when, viewed through said material comprising said matte surface.

10. The method of claim 1, wherein said non-diffuse surface is optically smooth.

* * * * *